US012422445B2

(12) United States Patent
Funakoshi et al.

(10) Patent No.: US 12,422,445 B2
(45) Date of Patent: Sep. 23, 2025

(54) AUTOMATED ANALYZER (71) Applicant: HITACHI HIGH-TECH CORPORATION, Tokyo (JP)

(72) Inventors: Sunao Funakoshi, Tokyo (JP); Takenori Okusa, Tokyo (JP); Nobuyuki Isoshima, Tokyo (JP); Koki Yokoyama, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 568 days.

(21) Appl. No.: 17/922,684

(22) PCT Filed: Feb. 18, 2021

(86) PCT No.: PCT/JP2021/006095
§ 371 (c)(1),
(2) Date: Nov. 1, 2022

(87) PCT Pub. No.: WO2021/245994
PCT Pub. Date: Dec. 9, 2021

(65) Prior Publication Data
US 2023/0266349 A1    Aug. 24, 2023

(30) Foreign Application Priority Data

Jun. 1, 2020   (JP) .................................. 2020-095589

(51) Int. Cl.
*G01N 35/00*   (2006.01)
*B01L 3/00*    (2006.01)
(Continued)

(52) U.S. Cl.
CPC ................ *G01N 35/00* (2013.01); *B01L 3/52* (2013.01); *B01L 7/04* (2013.01); *B65D 81/3876* (2013.01);
(Continued)

(58) Field of Classification Search
None
See application file for complete search history.

(56) References Cited

U.S. PATENT DOCUMENTS

| | | | |
|---|---|---|---|
| 6,209,343 B1 * | 4/2001 | Owen | F25D 3/105 62/530 |
| 2006/0168985 A1 * | 8/2006 | Gano | F25D 3/125 62/457.2 |

(Continued)

FOREIGN PATENT DOCUMENTS

| | | | |
|---|---|---|---|
| CN | 21687758 U | * | 4/2022 |
| EP | 2 365 342 A2 | | 9/2011 |

(Continued)

OTHER PUBLICATIONS

Chinese Office Action received in corresponding Chinese Application No. 202180032662.5 dated Jun. 13, 2025.

(Continued)

*Primary Examiner* — P. Kathryn Wright
(74) *Attorney, Agent, or Firm* — Mattingly & Malur, PC (57) ABSTRACT

To provide a reagent cooler reduced in size as compared with that in the related art by reducing a thickness of a heat insulation material of the reagent cooler, and an automated analyzer including the reagent cooler. In the reagent cooler of the automated analyzer, a vacuum heat insulation material is disposed in a periphery (on a side surface, or/and upper and lower portions) of a cooling jacket of the reagent cooler. Then, an end portion of the vacuum heat insulation material is disposed at a position shifted from upper and lower end portions and a side surface end portion of the cooling jacket and a distance between the end portion of the vacuum heat insulation material and the cooling jacket is taken as much as possible.

9 Claims, 7 Drawing Sheets

(51) Int. Cl.
*B01L 7/04* (2010.01)
*B65D 81/38* (2006.01)
(52) U.S. Cl.
CPC ... *B01L 2200/16* (2013.01); *B01L 2300/1883* (2013.01); *B01L 2300/1894* (2013.01); *G01N 2035/00445* (2013.01)

(56) References Cited

U.S. PATENT DOCUMENTS

| | | | |
|---|---|---|---|
| 2011/0223064 A1* | 9/2011 | Katsumi | G01N 35/1002 422/68.1 |
| 2012/0237398 A1 | 9/2012 | Katsumi et al. | |

FOREIGN PATENT DOCUMENTS

| | | | |
|---|---|---|---|
| JP | 2007-248084 A | 9/2007 |
| JP | 2012-194071 A | 10/2012 |
| JP | 2014-126224 A | 7/2014 |
| JP | 2015-197280 A | 11/2015 |
| JP | 2016206113 A | 12/2016 |

OTHER PUBLICATIONS

Communication Pursuant to Article 94(3) EPC received in corresponding European Application No. 21 816 944.9 dated Mar. 31, 2025.
International Search Report of PCT/JP2021/006095 dated Apr. 27, 2021.
Extended European Search Report received in corresponding European Application No. 21816944.9 dated Apr. 23, 2024.

* cited by examiner

AUTOMATED ANALYZER

TECHNICAL FIELD

The present invention relates to an automated analyzer including a reagent cooler.

BACKGROUND ART

As a reagent cooler of an automated analyzer, for example, a reagent cooler having a structure in which a cylindrical case that stores a reagent container is provided and an outer surface of the case is covered with a heat insulation material is known, as in PTL 1. PTL 1 does not particularly describe a material of the heat insulation material used for the cylindrical case, but a polystyrene foam or the like is generally used.

CITATION LIST

Patent Literature

PTL 1: JP-A-2016-206113

SUMMARY OF INVENTION

Technical Problem

However, in the technique in the related art as shown in PTL 1, a heat insulation material having a considerable thickness is required to prevent moisture in the air from condensing to outside. Therefore, there is a problem that a size of the automated analyzer becomes large.

In view of such circumstances, the present disclosure proposes a technique of providing a reagent cooler reduced in size as compared with that in the related art by reducing a thickness of a heat insulation material of the reagent cooler, and an automated analyzer including the reagent cooler.

Solution to Problem

In order to solve the above problems, the present disclosure proposes an automated analyzer that analyzes components in a specimen by reacting the specimen with a reagent, and the automated analyzer includes a reagent cooler including a cooling jacket that accommodates a plurality of reagent containers containing the reagent, a side surface heat insulation material provided on a side surface of the cooling jacket, an upper heat insulation material provided on an upper portion of the cooling jacket, a lower heat insulation material provided on a lower portion of the cooling jacket, a frame member that covers a periphery of the side surface heat insulation material, and a cooling device that cools the cooling jacket. The side surface heat insulation material includes a first heat insulation material formed of a vacuum heat insulation material, and a second heat insulation material formed of a heat insulation material other than the vacuum heat insulation material, the first heat insulation material is provided at a position between the cooling jacket and the frame member, the second heat insulation material is provided between the first heat insulation material and the cooling jacket and/or between the first heat insulation material and the frame member, an upper portion of the first heat insulation material is located above an upper end portion of the cooling jacket, and a lower portion of the first heat insulation material is located below a lower end portion of the cooling jacket.

Further features related to the present disclosure will become clear from the description in the specification and the accompanying drawings. In addition, aspects of the present disclosure will be achieved and realized by elements, combinations of various elements, the following detailed description, and aspects of the attached claims.

It should be understood that the description in the specification is merely a typical example and does not limit the claims or application examples of the present disclosure in any way.

Advantageous Effects of Invention

According to the technique of the present disclosure, a reagent cooler reduced in size as compared with that in the related art by reducing a thickness of a heat insulation material of the reagent cooler, and an automated analyzer including the reagent cooler can be provided.

DESCRIPTION OF EMBODIMENTS

Embodiments of the present disclosure will be described below with reference to the accompanying drawings. In the accompanying drawings, elements that are functionally the same may be represented with the same number. The accompanying drawings show specific embodiments and implementation examples in accordance with principles of the present disclosure, but these embodiments and implementation examples are used for the purpose of understanding the present disclosure, and not used to interpret the present disclosure in a limited way.

It should be understood that the present embodiments are described in sufficient detail to enable a person skilled in the art to implement the present disclosure, but other implementations and forms are also possible, and various modifications in a configuration or structure and substitutions of various elements may be made without departing from the technical scope and spirit of the present disclosure. Therefore, the following description should not be interpreted as being limited thereto.

(1) First Embodiment

<Configuration Example of Reagent Cooler of Automated Analyzer>

Figure 1:
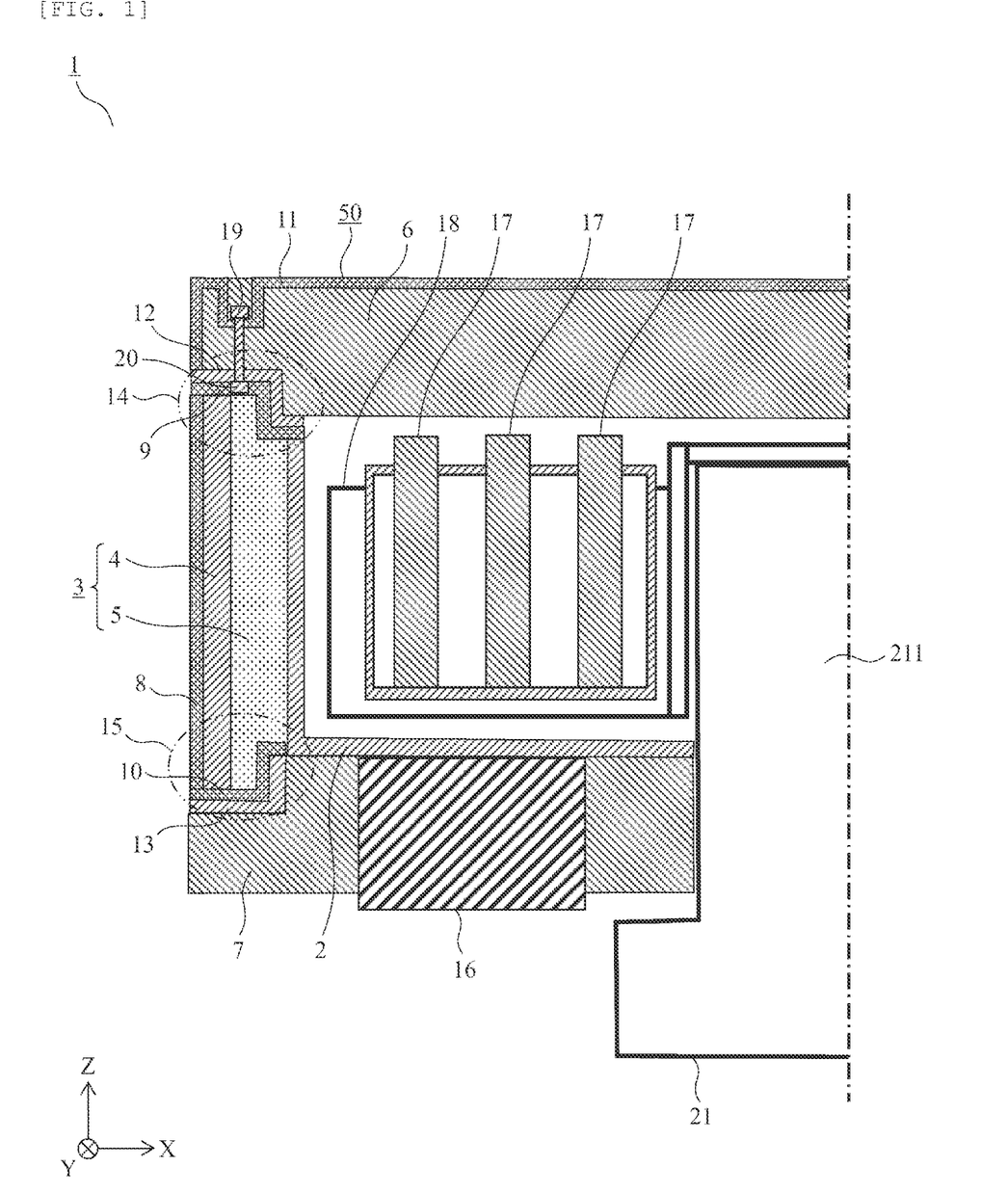
FIG. 1 is a diagram showing a cross-sectional configuration example of a reagent cooler of an automated analyzer according to a first embodiment.

FIG. 1 is a diagram showing a cross-sectional configuration example of a reagent cooler of an automated analyzer according to a first embodiment. FIG. 1 shows only a configuration of a reagent cooler 1 in a left side cross section of a rotation axis 211, which will be described later. In addition, an upper portion and a lower portion of the reagent cooler 1 are defined in a Z-axis direction in FIG. 1.

In FIG. 1, reagent bottles 17 provided inside the reagent cooler 1 are placed on a reagent disk 18. The reagent disk 18 is configured to be rotatable within an XY plane by a driving unit 21 about the rotation axis 211 (extending in a Z direction).

A cooling jacket (also referred to as a reagent jacket) 2 is provided in a periphery (on a side surface) and a lower surface of the reagent disk 18. This cooling jacket 2 is cooled by a cooling device 16 such as a Peltier cooling unit attached to a lower surface of the reagent cooler 1. A material having relatively high thermal conductivity, such as copper or aluminum, is used for the cooling jacket 2 in order to conduct heat effectively.

A lower side of the cooling jacket 2 is filled with a lower heat insulation material 7 such as a polystyrene foam to insulate heat from the outside. A resin frame 8 made of polypropylene or the like is provided on an outermost side of a side surface of the reagent cooler 1. Then, a vacuum heat insulation material 4 is fixed to the resin frame 8 with an adhesive or the like. An upper resin material 9 is provided on an upper portion of the vacuum heat insulation material 4, and a lower resin material 10 is provided on a lower portion of the vacuum heat insulation material 4. A portion between the vacuum heat insulation material 4 and the cooling jacket 2 and between the upper resin material 9 and the lower resin material 10 is filled with a heat insulation material 5 such as a urethane foam material. In the present embodiment, a combination of the vacuum heat insulation material 4 and the urethane foam material 5 is referred to as a peripheral heat insulation portion (peripheral heat insulation material) 3.

The upper portion of the reagent cooler 1 is formed by an upper heat insulation material 6 such as polystyrene foam and a resin frame 11 such as polypropylene, and covered by an upper cover 50. In addition, a sealing material 12 (for example, silicon, modified silicon, urethane, acryl, polysulfide, and the like) is provided between the upper resin material 9 and the upper heat insulation material 6. A nut 20 is embedded in the upper resin material 9, and the upper cover 50 and the nut 20 are fixed by a bolt 19. The bolt 19 and the nut 20 can be made of a resin such as a fluororesin, considering an influence of heat leakage caused by heat conduction. A sealing material 13 is provided between the lower resin material 10 and the lower heat insulation material 7.

A step 14 is provided between a lower side of the upper heat insulation material 6 and an upper side of the peripheral heat insulation portion (peripheral heat insulation material) 3. In addition, a step 15 is provided between an upper side of the lower heat insulation material 7 and a lower side of the peripheral heat insulation portion (peripheral heat insulation material) 3. By this step 14, positions of the upper portion of the vacuum heat insulation material 4 and an upper portion of the cooling jacket 2 can be shifted so that the upper portion of the vacuum heat insulation material 4 is disposed above the upper portion of the cooling jacket 2. In addition, by the step 15, positions of the lower portion of the vacuum heat insulation material 4 and a lower portion of the cooling jacket 2 can be shifted so that the lower portion of the vacuum heat insulation material 4 is disposed below the lower portion of the cooling jacket 2. As will be described later, these steps 14 and 15 make it possible to reduce heat transferred from the vacuum heat insulation material 4 to the cooling jacket 2.

<Configuration of Vacuum Heat Insulation Material>

Figure 2:
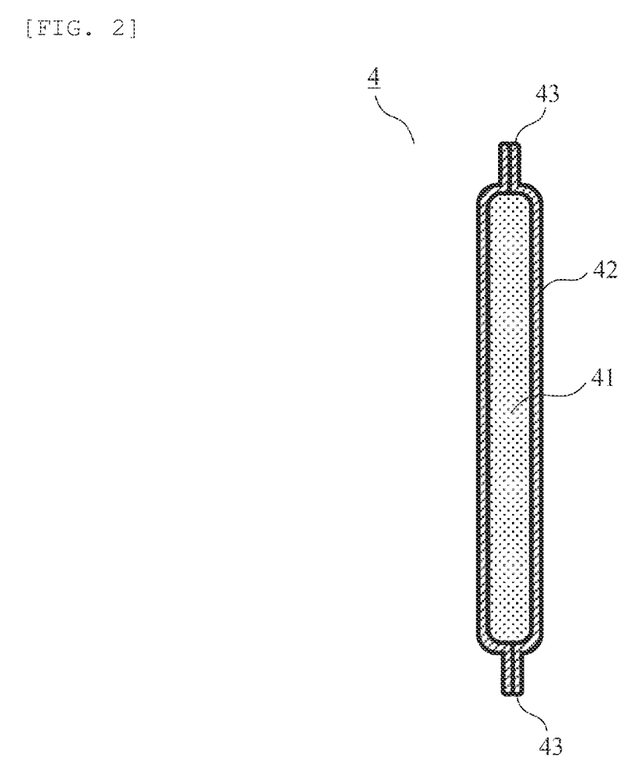
FIG. 2 is a diagram showing a cross-sectional configuration example of a vacuum heat insulation material 4.
Figure 3:
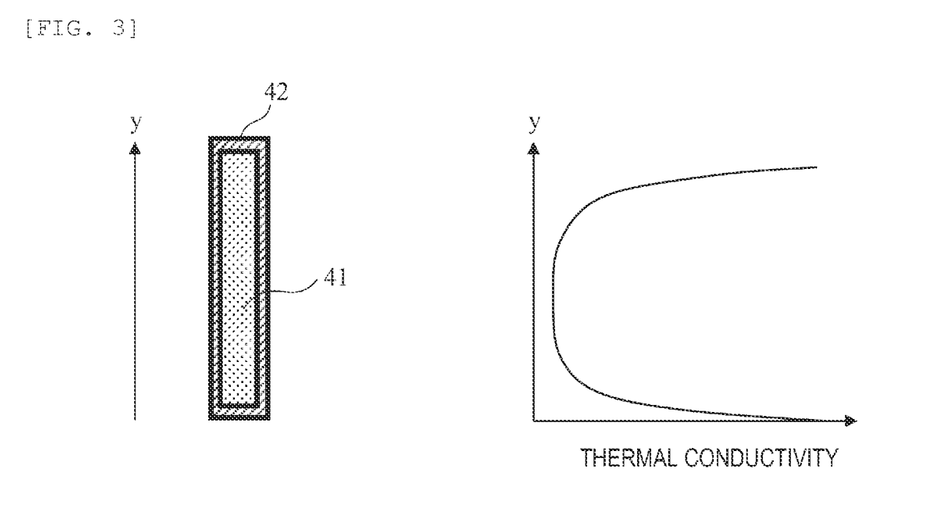
FIG. 3 is a diagram schematically showing characteristics of thermal conductivity of the vacuum heat insulation material.

FIG. 2 is a diagram showing a cross-sectional configuration example of the vacuum heat insulation material 4. FIG. 3 is a diagram showing thermal conductivity of the vacuum heat insulation material 4.

As shown in FIG. 2, the vacuum heat insulation material 4 is a heat insulation material formed of a core material 41 and an outer cover material 42 that wraps the core material 41 and is a composite material having a gas barrier property, and obtained by reducing a pressure inside the outer cover material 42 to a vacuum state. As the core material 41, a fibrous material such as glass wool, a foam, or a powder material is used. In addition, as the outer cover material 42, an aluminum deposition film or the like is used.

Thermal conductivity of the outer cover material 42 is higher than that inside the vacuum. Therefore, as schematically shown in FIG. 3, thermal conductivity of both end portions of the vacuum heat insulation material is high. Lugs 43 at both end portions in FIG. 2 (the vacuum heat insulation material is inevitably formed with lugs) are actually mounted in a folding manner, and the lugs are omitted in FIG. 3. Since both end portions of the vacuum heat insulation material 4 have the high thermal conductivity in this manner, by providing the steps 14 and 15 and shifting positions of top and bottom end portions of the cooling jacket 2 and positions of the end portions of the vacuum heat insulation material 4 as described above, heat transferred through both end portions of the vacuum heat insulation material 4 (heat from the outside) can be reduced.

<Relationship between Cooling Capacity and Temperature Reduction Amount: Heat Insulation Performance>

Figure 4:
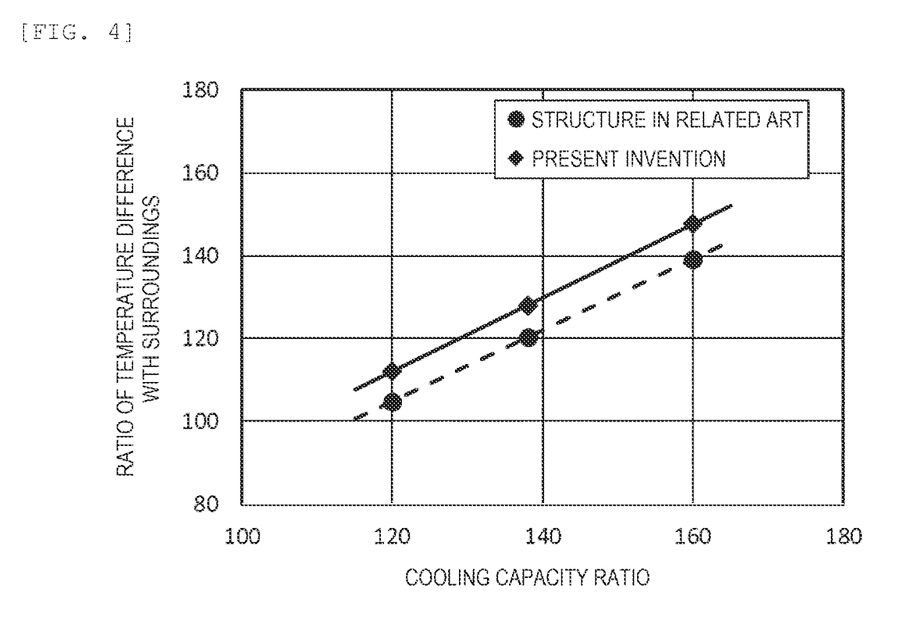
FIG. 4 is a diagram showing a relationship (heat insulation performance) between cooling capacity and a temperature reduction amount when a top and bottom height of a cooling jacket 2 and a height of an end portion of the vacuum heat insulation material 4 are aligned (structure in the related art) and when the two heights are shifted (present embodiment).

FIG. 4 is a diagram showing a relationship (heat insulation performance) between cooling capacity and a temperature reduction amount when a top and bottom height of the cooling jacket 2 and a height of the end portions of the vacuum heat insulation material 4 are aligned (structure in the related art) and when the two heights are shifted (present embodiment). In FIG. 4, each of the cooling capacity and the temperature reduction amount is represented by a ratio to a reference.

As shown in FIG. 4, it can be seen that a structure of the present embodiment is capable of cooling the inside to a lower temperature with the same cooling capacity. In addition, at the same internal temperature, the cooling capacity can be reduced. Since heat insulation performance of the peripheral heat insulation portion 3 is improved in this manner, a thickness of the peripheral heat insulation portion (peripheral heat insulation material) 3 can be reduced with the same internal temperature and cooling capacity. Specifically, the thickness of the peripheral heat insulation portion (peripheral heat insulation material) 3 can be reduced by about 10%.

As described above, the structure of the present embodiment makes it possible to reduce a thickness of a peripheral heat insulation material (heat insulation material provided on a side surface of the reagent cooler 1), and therefore, it is possible to reduce a size of the reagent cooler and, furthermore, a size of the automated analyzer.

(2) Second Embodiment

Figure 5:
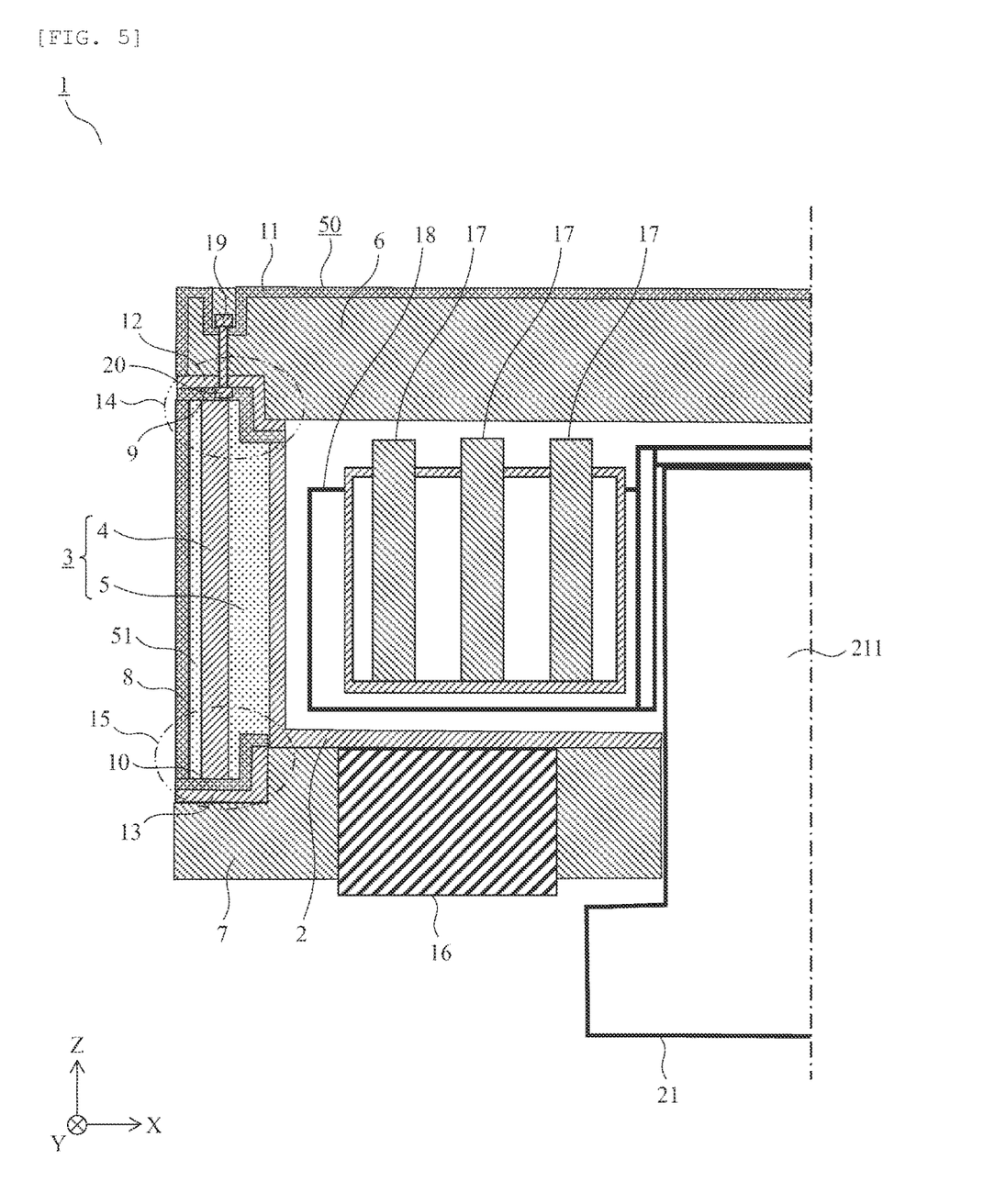
FIG. 5 is a diagram showing a cross-sectional configuration example of a reagent cooler 1 of an automated analyzer according to a second embodiment.

FIG. 5 is a diagram showing a cross-sectional configuration example of the reagent cooler 1 of an automated analyzer according to a second embodiment. Portions common to the first embodiment are given the same numbers.

In the second embodiment, the vacuum heat insulation material 4 is provided at a position away from the resin frame 8, and both sides of the vacuum heat insulation material 4 are filled with the urethane foam material 5 and a urethane foam material 51. Also in such a structure, the thickness of the heat insulation material on the side surface of the reagent cooler 1 can be reduced as in the first embodiment.

Figure 6:
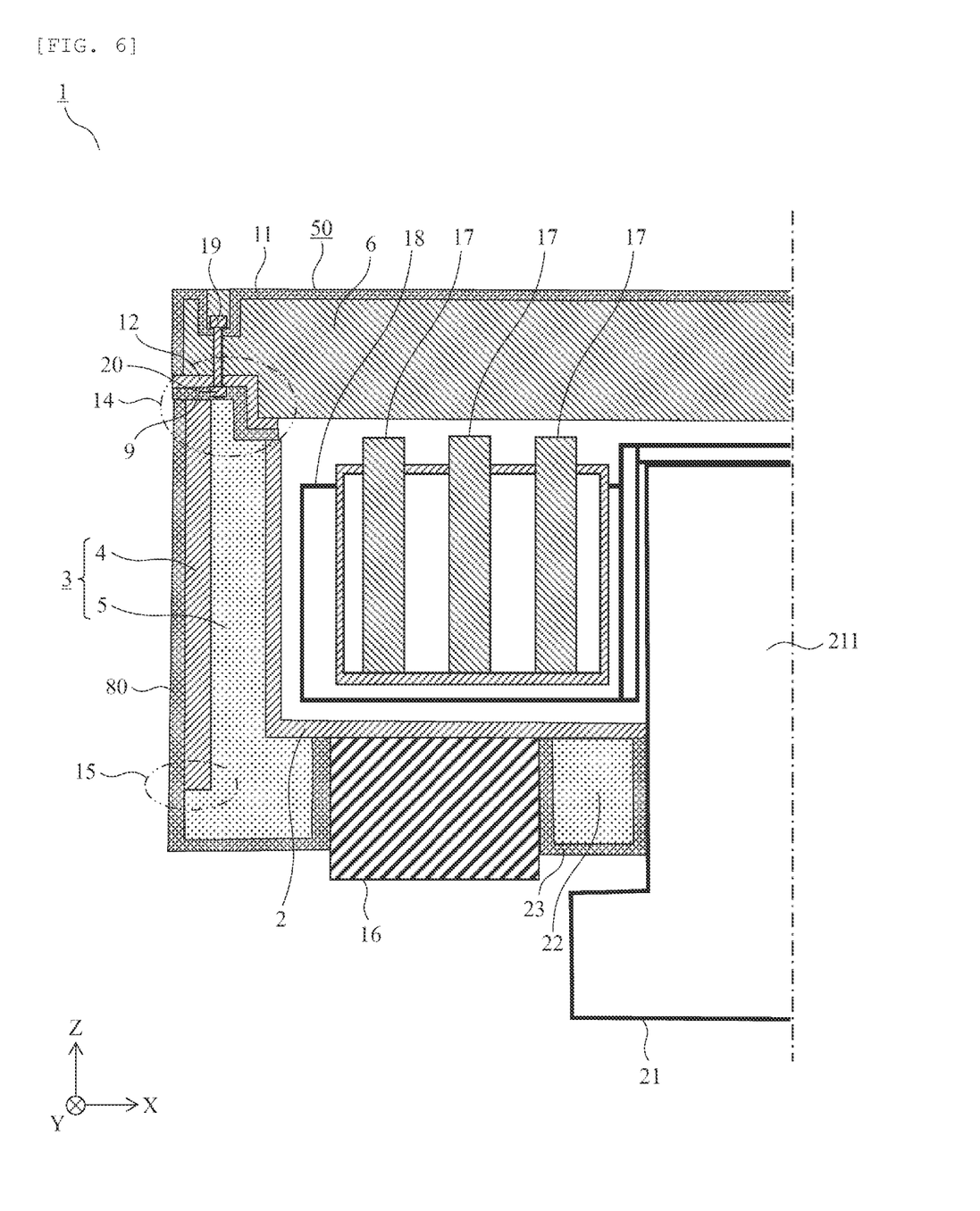
FIG. 6 is a diagram showing a cross-sectional configuration example of the reagent cooler 1 of an automated analyzer according to a third embodiment.
Figure 7:
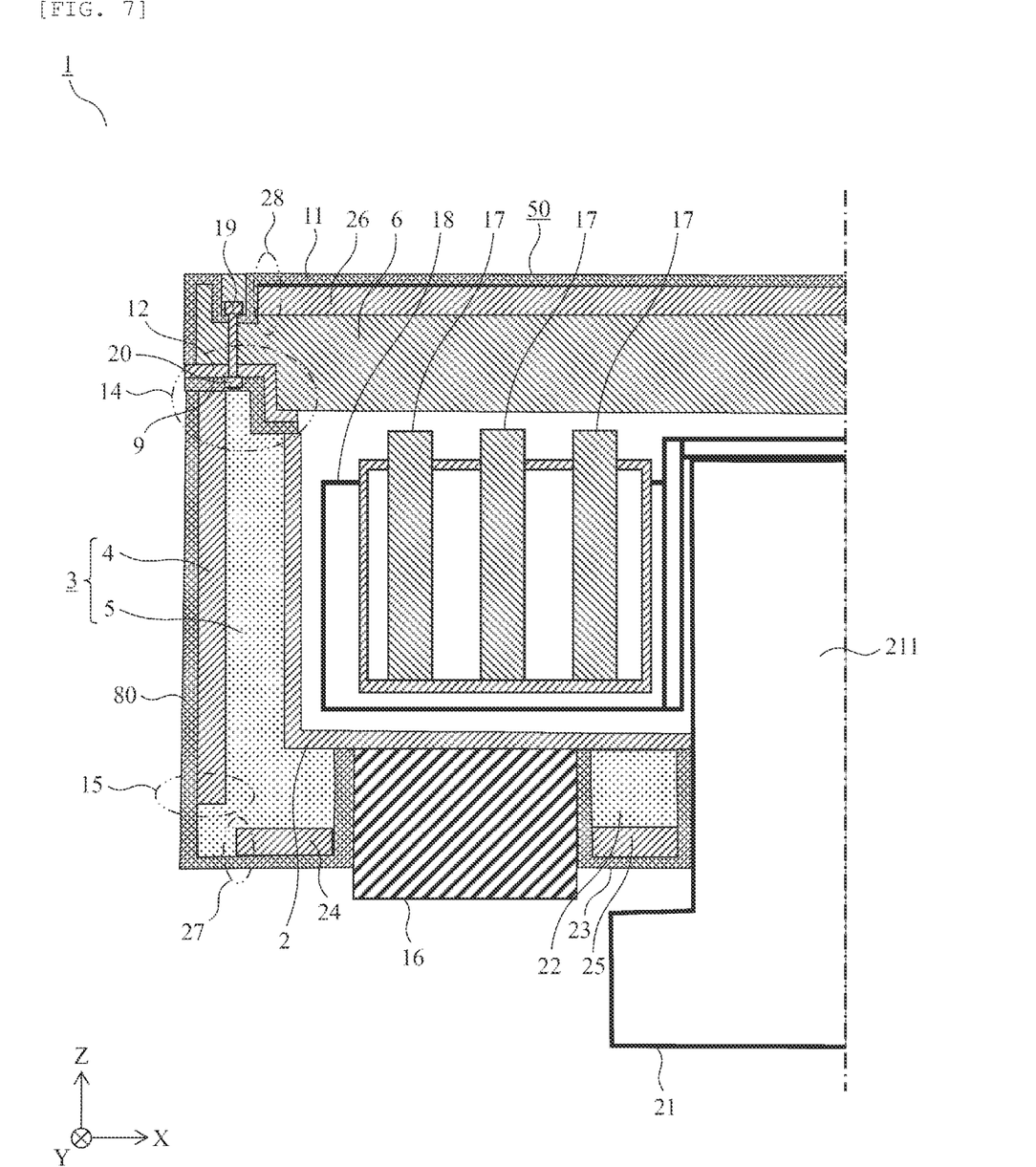
FIG. 7 is a diagram showing a cross-sectional configuration example of the reagent cooler 1 of an automated analyzer according to a fourth embodiment.
Figure 8:
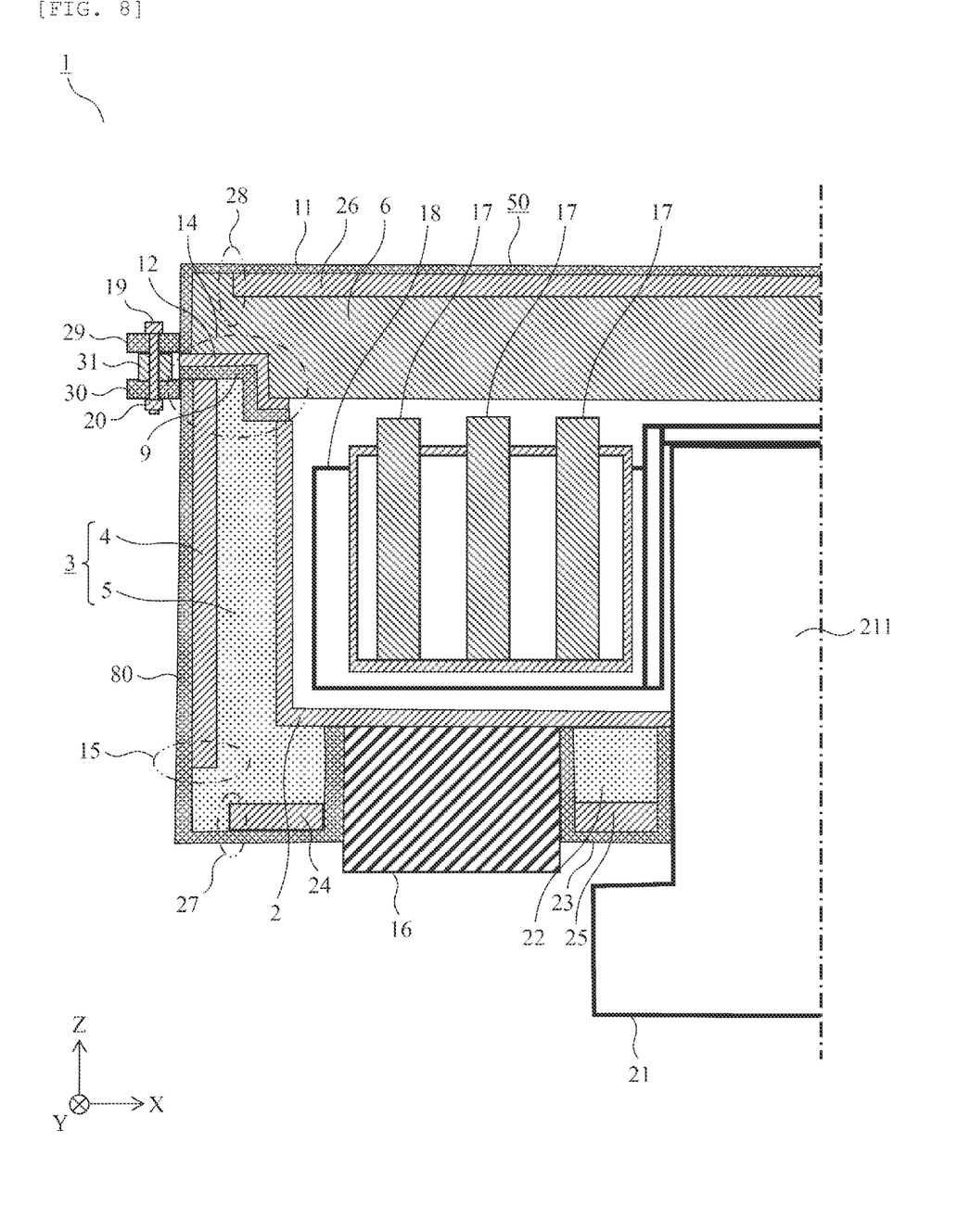
FIG. 8 is a diagram showing a cross-sectional configuration example of the reagent cooler 1 of an automated analyzer according to a fifth embodiment.

In the following third to fifth embodiments, each of the vacuum heat insulation materials provided on a side surface, a lower portion, the upper cover 50, and the like will be described as having a shape of being in close contact with the resin frame respectively, and as in the second embodiment, a structure in which the vacuum heat insulation material 4 is provided at a position away from the resin frame and both sides of the vacuum heat insulation material 4 are filled with the urethane foam material 51 also can be employed. Also in this way, thicknesses of the heat insulation materials on the side surface, a lower portion, and the upper portion can be reduced as in the second embodiment.

(3) Third Embodiment

FIG. 6 is a diagram showing a cross-sectional configuration example of the reagent cooler 1 of an automated analyzer according to a third embodiment. Portions common to the first embodiment are given the same numbers.

A resin frame 80 of the reagent cooler 1 according to the third embodiment is configured by extending a lower side portion of the resin frame 8 shown in the first embodiment. In practice, the resin frame 80 can be manufactured by integrally molding a side surface portion and a lower side portion, or by joining these portions with an adhesive or the like.

A resin frame 23 is connected to the resin frame 80 at a portion where the cooling device 16 is not provided, and has a structure surrounding a periphery of the cooling device 16. By injecting a urethane foam material into a side surface portion and a lower side portion of the cooling jacket 2 and foaming, a structure is obtained in which a side surface heat insulation portion and a lower side heat insulation portion are integrated. At this time, the urethane foam material 5 and a urethane foam material 22 are injected together into the resin frame 23 and connected at the portion where the cooling device 16 is not provided.

In addition, in the third embodiment, a length of the vacuum heat insulation material 4 is set longer than a length of the vacuum heat insulation material in the first embodiment, and a position of a lower side portion of the vacuum heat insulation material 4 becomes a position below the cooling jacket 2. In addition, in the third embodiment, the step 14 is provided on the upper side of the peripheral heat insulation portion (peripheral heat insulation material) 3 as in the first embodiment. In this manner, both end portions of the vacuum heat insulation material 4 (which have a higher thermal conductivity than that of a central portion of the vacuum heat insulation material 4) can be kept away from the cooling jacket 2.

As described above, according to the present embodiment, by integrally manufacturing a heat insulation material of a side surface and a heat insulation material of a lower side surface, a joint portion between the side surface heat insulation material and the lower side heat insulation material can be eliminated, and therefore, heat leakage from the joint portion can be prevented. In addition, since the portion of the side surface heat insulation material can be made thinner, it is possible to further reduce the size of the reagent cooler.

(4) Fourth Embodiment

FIG. 7 is a diagram showing a cross-sectional configuration example of the reagent cooler 1 of an automated analyzer according to a fourth embodiment.

In the fourth embodiment, vacuum heat insulation materials 24 and 25 are attached to a lower side portion in addition to a side surface. The vacuum heat insulation material 24 is fixed to a lower portion of the resin frame 80 by an adhesive or the like, and the vacuum heat insulation material 25 is fixed to the resin frame 23 by an adhesive or the like, respectively.

In addition, a vacuum heat insulation material 26 is attached to the upper cover 50. The vacuum heat insulation material 26 is fixed to the resin frame 11 by an adhesive or the like. The upper heat insulation material 6 may be manufactured using a urethane foam material like the other heat insulation portions. An end portion 27 of the vacuum heat insulation material 24 of the lower side portion is provided so as to be located further outside an outer surface of the cooling jacket 2. In addition, an end portion 28 of the vacuum heat insulation material 26 attached to the upper cover 50 is provided so as to be located further outside the outer surface of the cooling jacket 2.

In this way, the vacuum heat insulation materials are also attached to the lower side portion and the upper cover portion, and the end portions of these vacuum heat insulation materials are provided so as to be located further outside the outer surface of the cooling jacket 2. In this manner, the heat insulation performance is improved, a heat insulation material 22 of the lower side portion and the upper heat insulation material 6 of the upper cover portion can be made thinner, and therefore, the size of the reagent cooler can be further reduced.

(5) Fifth Embodiment

FIG. 8 is a diagram showing a cross-sectional configuration example of the reagent cooler 1 of an automated analyzer according to a fifth embodiment. In the fifth embodiment, a resin flange 29 for fixing the upper cover 50 is provided on the resin frame 11 and a flange 30 is provided on an upper portion of the resin frame 8. The upper cover 50 is fixed by the bolt 19 and the nut 20.

With such a structure, it is possible to prevent peripheral heat from entering through the bolt and the nut. In addition, since the end portion 28 of the vacuum heat insulation material 26 can be provided further outside, heat insulation performance of the upper cover 50 can be improved, and a thickness of the upper heat insulation material 6 can be further reduced, and therefore the size of the reagent cooler 1 can be further reduced. Since the bolt and the nut can be provided outside the reagent cooler 1, a metal bolt and a metal nut can be used.

(6) Summary

In the present embodiments, the thickness of the heat insulation material is reduced by using a vacuum heat insulation material having a high heat insulation efficiency. However, since the end portions of the vacuum heat insulation material have the lugs 43, the heat insulation efficiency at the end portions is lower than that at the other portions. Therefore, when the vacuum heat insulation materials (vacuum heat insulation materials 4, 24 to 26) are disposed in a periphery (on a side surface, or/and upper and lower portions) of the reagent cooler 1, the end portions of the vacuum heat insulation materials are disposed at positions shifted from the top and bottom end portions and a side surface end portion of the cooling jacket 2 such that distances between the end portions of the vacuum heat insulation materials and the cooling jacket 2 are taken as much as possible. Consequently, it is possible to prevent heat from entering the cooling jacket 2 through the end portions of the vacuum heat insulation materials having high conductivity, so that heat insulation effects of the heat insulation materials are improved. Then, since the heat insulation effects of the vacuum heat insulation materials can be maximized, thicknesses of the heat insulation materials other than the vacuum insulation materials (insulation materials formed of a urethane foam material, polystyrene foam, or the like) can be made thinner than that of the related art. In this way, the heat insulation materials of the reagent cooler 1 can be made thinner than that of a configuration in the related art, and therefore, the size of the reagent cooler 1 and, furthermore, the size of the automated analyzer can be reduced. The automated analyzer can be applied to devices that require reagents to be stored at a low temperature, such as an immunology analyzer and a biochemical analyzer.

REFERENCE SIGNS LIST 1 reagent cooler
2 cooling jacket
3 peripheral heat insulation portion (peripheral heat insulation material)
4 vacuum heat insulation material
5 urethane foam material
6 upper heat insulation material
7 lower heat insulation material
8, 80 resin frame
9 upper resin material
10 lower resin material
11 resin frame
12, 13 sealing material
14, 15 step
16 cooling device
17 reagent bottle
18 reagent disk
19 bolt
20 nut
21 driving unit
22 urethane foam material
23 resin frame
24, 25 lower vacuum heat insulation material
26 upper vacuum heat insulation material
27 lower vacuum heat insulation material end portion
28 upper vacuum heat insulation material end portion
29, 30 flange
31 spacer
41 core material
42 outer cover material
50 upper cover
211 rotation axis

The invention claimed is:

1. An automated analyzer that analyzes components in a specimen by reacting the specimen with a reagent, the automated analyzer comprising:
a reagent cooler including:
a cooling jacket that accommodates a plurality of reagent containers containing the reagent,
a side surface heat insulation material provided on a side surface of the cooling jacket,
an upper heat insulation material provided on an upper portion of the cooling jacket,
a lower heat insulation material provided on a lower portion of the cooling jacket,
a frame member that covers a periphery of the side surface heat insulation material, and
a cooling device that cools the cooling jacket,
wherein the side surface heat insulation material includes a first heat insulation material formed of a vacuum heat insulation material, and a second heat insulation material formed of a heat insulation material other than the vacuum heat insulation material, the first heat insulation material is provided at a position between the cooling jacket and the frame member, the second heat insulation material is provided between the first heat insulation material and the cooling jacket and/or between the first heat insulation material and the frame member, an upper portion of the first heat insulation material is located above an upper end portion of the cooling jacket, and a lower portion of the first heat insulation material is located below a lower end portion of the cooling jacket;
wherein
a first step portion is provided at a boundary portion between the side surface heat insulation material and the upper heat insulation material,
a second step portion is provided at a boundary portion between the side surface heat insulation material and the lower heat insulation material,
the frame member is disposed in a first space formed by the first step portion and the second step portion, and
the cooling jacket is disposed in a second space formed by the first step portion and the second step portion, and
a distance of the first space in a height direction is larger than a distance of the second space in the height direction.

2. The automated analyzer according to claim 1, wherein the first step portion and the second step portion are formed of a resin material.

3. The automated analyzer according to claim 1, wherein the second heat insulation material and the lower heat insulation material are integrally formed,
the frame member extends so as to cover a lower portion of the cooling jacket, and
the frame member is filled with the second heat insulation material and the lower heat insulation material.

4. The automated analyzer according to claim 1, wherein the step portion is formed of a resin material.

5. The automated analyzer according to claim 1, further comprising:
an upper frame member that covers the upper heat insulation material, wherein the upper heat insulation material includes a third heat insulation material formed of a vacuum heat insulation material, and a fourth heat insulation material formed of a heat insulation material other than the vacuum heat insulation material, and an end portion of the third heat insulation material is located outside a side surface end portion of the cooling jacket.

6. The automated analyzer according to claim 1, further comprising:

a lower frame member that covers the lower heat insulation material, wherein the lower heat insulation material includes a sixth heat insulation material formed of a vacuum heat insulation material, and a seventh heat insulation material formed of a heat insulation material other than the vacuum heat insulation material, and an end portion of the sixth heat insulation material is located outside a side surface end portion of the cooling jacket.

7. The automated analyzer according to claim 1, wherein the second heat insulation material is formed of a urethane foam material.

8. The automated analyzer according to claim 1, wherein the upper heat insulation material and the frame member are connected to each other by a bolt and a nut at the first step portion.

9. The automated analyzer according to claim 8, wherein flanges are provided on an upper cover that covers the upper heat insulation material and on the frame member, respectively, and the flanges are connected by the bolt and the nut.

* * * * *